Patented Mar. 6, 1934

1,949,810

UNITED STATES PATENT OFFICE

1,949,810

METHOD OF MAKING COMBUSTIBLE GAS

Joseph A. Perry, Swarthmore, and Walter H. Fulweiler, Wallingford, Pa., assignors to The United Gas Improvement Company, Philadelphia, Pa., a corporation of Pennsylvania No Drawing. Application May 6, 1929, Serial No. 360,988

3 Claims. (Cl. 48—204)

The present invention relates to the manufacture of combustible gas for domestic and industrial consumption.

For some years the gas industry has given consideration to the possibility of distributing a permanent gas, free from condensible vapors and deleterious substances such as sulphur compounds and likewise free from carbon monoxide so that there would be no danger of poisoning on leakage of the gas from the distribution system.

The present distributed manufactured gas is largely coal gas and carburetted water gas. Carburetted water gas contains a large amount of carbon monoxide, coal gas contains carbon monoxide, but in much smaller proportion.

Recently it has been proposed that blue water gas be passed over a suitable catalyst at a somewhat elevated temperature with the conversion of the carbon monoxide and the hydrogen in the blue water gas to methane and carbon dioxide. The carbon dioxide was then to be removed and recovered as dry ice. It was also proposed to mix the methane with approximately 20% of oxygen and to distribute the mixed gas. This gas would contain the same amount of oxygen as atmospheric air and would avoid the possibility of suffocation on leakage. The addition of the oxygen would reduce the calorific power to approximately 800 B. t. u. per cu. ft. and would reduce the amount of air required for combustion, making the gas more suitable for combustion in ordinary burners.

A practical objection to the above proposal, however, lies in the fact that at the present time coal gas or coke oven gas is the base load gas to the extent of probably 33 to 35% of the total consumption and any proposal for the elimination or substantial reduction of carbon monoxide should take into consideration this relatively large volume of coal gas or coke oven gas which is already low in carbon monoxide content.

The mixed methane and oxygen of the above proposal would have radically different calorific power, specific gravity and flame characteristics from the present coal or coke oven gas or coal and coke oven gas with its carbon monoxide removed, and would not be interchangeable with it.

It would appear very inadvisable to replace the base load coal gas with the proposed gas, and the proposed gas would not be suitable as a peak gas with the use of coal gas as the base.

Among other objects, the present invention is directed to the manufacture from blue water gas, of a gas containing no carbon monoxide or a greatly reduced carbon monoxide content, and which will be sufficiently matchable in calorific power and specific gravity with the present coal or coke oven gas (with or without its present carbon monoxide content) to be used interchangeably with it (as a peak gas) without the necessity of appliance burner readjustment.

According to the present invention blue water gas containing, for example, 51% hydrogen and 38% CO is produced utilizing the well-known water gas process of alternately air blasting and steaming an ignited fuel bed. The blue water gas is then subjected to treatment for the removal of a portion of its carbon monoxide content. The blue water gas may be subjected to a low temperature, liquefying the carbon monoxide and separating it from the other constituents, or the blue water gas may be scrubbed with ammoniacal solutions of copper salts to absorb the carbon monoxide, and recovering the carbon monoxide by driving it off from the solution by heating. Other methods of removing the carbon monoxide from the blue water gas may be employed in place of the above which are given for illustration.

Sufficient carbon monoxide is removed from the blue water gas to reduce the relation between the carbon monoxide and hydrogen contents to the approximate proportion of one to three. The treated blue water gas, after the above carbon monoxide removal, is then passed over a suitable catalyst as, for instance, nickel at a somewhat elevated temperature converting the carbon monoxide and hydrogen to methane and water vapor, the water vapor is condensed out leaving the methane.

The carbon monoxide removed and recovered from the original blue water gas is passed with steam at an elevated temperature over a suitable catalyst as, for instance, activated iron oxide, forming hydrogen and carbon dioxide, the carbon dioxide is removed as, for instance, by scrubbing the gas with water and the hydrogen is united with or added to the methane produced above.

For example, starting with blue water gas containing approximately 51% $H_2$ and 38% CO—6% $CO_2$—0.5% $O_2$—4.5% $N_2$, scrubbing the gas with an ammoniacal solution of copper chloride and removing 21% CO and 4% $CO_2$ and some oxygen leaves, in percentages of the original gas, —51% $H_2$—17% CO—2% $CO_2$—.1% $O_2$—4.5% $N_2$.

This is methanated by passing it over a nickel catalyst at a somewhat elevated temperature producing, in percentages of the original gas, 17% $CH_4$—2% $CO_2$—.1% $O_2$—4.5% N. The reaction being $CO+3H_2=CH_4+H_2O$. The 21% CO+4% $CO_2$ removed from the gas is passed over an activated iron catalyst at an elevated temperature with steam producing 21% H₂+25% CO₂ according to the reaction CO+H₂O=CO₂+H₂. The CO₂ is scrubbed out and the 21% H₂ added to the methanated gas producing a final gas of the following approximate composition —38.2% CH₄—47.1% H₂—4.5% CO₂—.2% O₂—10% N and having a heating value of approximately 540 B. t. u. per cu. ft., and an approximate specific gravity of .41. This gas is completely replaceable for present distributed coal or coke oven gas without the necessity of appliance burner readjustments and therefore makes an ideal peak gas.

The above example assumes the complete elimination of the carbon monoxide from the blue water gas by initial removal of a portion and the conversion of the remainder to methane. It is not desired to limit the invention to such complete removal but to the substantial reduction or complete removal of the carbon monoxide.

Coal or coke oven gas contains a much smaller percentage of carbon monoxide than blue water gas—the percentage varies but is in the neighborhood of 7% to 9%. If it is desired to distribute a gas entirely free from carbon monoxide, the carbon monoxide in the coal gas may be removed by the methods indicated for blue water gas and recovered. It may then be passed with steam over an activated iron catalyst at elevated temperature producing hydrogen and CO₂ according to the reaction previously mentioned—CO+H₂O=CO₂+H₂. The hydrogen, after the CO₂ has been separated, may be added to the coal gas to replace the CO removed, or it may be added to blue water gas to increase the hydrogen content of the latter prior to methanation, reducing the amount of carbon monoxide to be removed from the blue water gas in order to arrive at the ratio of 1CO to 3H₂ in the blue water gas for methanation.

Instead of securing hydrogen to replace the carbon monoxide removed from blue water gas prior to methanation by passing the carbon monoxide with steam over an activated iron oxide catalyst, the following modified method may be employed.

The hot air blast gases from the fuel bed of the water gas generator may be used to heat a chamber filled with iron oxide (hematite ore) and the carbon monoxide removed, as described, may be passed through the iron-oxide to reduce its surface to spongy iron, then steam may be passed through the filling to react with the iron to form hydrogen and to reoxidize the iron, the hydrogen is then added to the methanated gas as before described.

Broadly stated one aspect of our invention includes treating blue water gas for the removal of a portion of its carbon monoxide content, recovering the carbon monoxide removed, passing the treated blue water gas at an elevated temperature over a suitable catalyst with the production of methane and water vapor, utilizing the carbon monoxide removed for the production of hydrogen, and adding the hydrogen to the methanated gas to produce a mixed gas suitable for industrial and domestic consumption.

According to a modification of the foregoing method, the blue water gas may be treated for the removal of a larger proportion of its carbon monoxide content than is required to give the ratio of 3H₂ to 1CO, for example, starting with the same blue water gas given in the example above, 51% H₂, 38% CO, 2% CO₂, 0.5% O₂, 4.5% N₂, the gas is treated to remove 25% CO and a portion of the O₂ leaving in percentages in the original gas, 51% H₂, 13% CO, 2% CO₂, 0.5% O₂ and 4.5% N₂. This gas is methanated giving in percentages of the original gas, 13% CH₄, 12% H₂, 2% CO₂, 5% O₂, 4.5% N₂ or a gas of the approximate composition —40.6% CH₄, 37.5% H, 6.2% CO₂, 1.6% O₂, 14.1% N₂ and having a heating value of approximately 530 B. t. u. per cu. ft. and an approximate specific gravity of .5 which is comparable with present distributed gas.

In this case, the CO removed from the original blue water gas need not be used for the production of hydrogen but is available for other use as, for instance, boiler or other furnace firing, or as a reducing gas for chemical processes.

We claim:

1. The method of producing a combustible gas for domestic and industrial consumption which includes treating coal gas for the substantial removal of its carbon monoxide content, recovering the carbon monoxide removed, producing hydrogen by a process utilizing the carbon monoxide recovered from the coal gas, uniting the hydrogen so produced with blue water gas, removing a portion of the carbon monoxide content from the blue water gas after the addition of the hydrogen, recovering the carbon monoxide removed, converting a substantial portion of the carbon monoxide remaining in the blue water gas together with all or part of the hydrogen to methane, producing hydrogen by a process utilizing the carbon monoxide recovered from the blue water gas, and uniting the hydrogen so produced with the methanated blue water gas.

2. The method of producing a combustible gas for domestic and industrial consumption which includes, treating coal gas for the substantial removal of its carbon monoxide content, recovering the carbon monoxide removed, producing hydrogen by a process utilizing the carbon monoxide recovered from the coal gas, treating blue water gas for the removal of a portion of its carbon monoxide content, recovering the carbon monoxide removed, producing hydrogen by a process utilizing the carbon monoxide removed, adding to the treated blue water gas the first mentioned hydrogen, converting a substantial portion of the carbon monoxide and all or part of the hydrogen in the treated blue water gas to methane, and adding to the methanated blue water gas the hydrogen produced by utilizing the carbon monoxide removed from the blue water gas.

3. The method of producing a non-poisonous, commercially distributable, combustible gas matchable in specific gravity, calorific power, and flame characteristics with coal gas which process includes: treating coal gas for the substantial removal of its carbon monoxide content; recovering the carbon monoxide removed; producing hydrogen by a process utilizing the carbon monoxide recovered from the coal gas; uniting the hydrogen so produced with blue water gas; removing the excess portion of its carbon monoxide content from the mixed hydrogen and blue water gas so that the ratio of hydrogen to carbon monoxide remaining in the treated blue water gas is 3 to 1; and converting the remaining portion of the carbon monoxide together with all or part of the hydrogen to methane by passing the treated blue water gas over a nickel containing substance at an elevated temperature.

JOSEPH A. PERRY.
WALTER H. FULWEILER.